US009226267B2

(12) United States Patent
Warner et al.

(10) Patent No.: US 9,226,267 B2
(45) Date of Patent: *Dec. 29, 2015

(54) METHOD FOR MODIFYING FUNCTIONS IN A WIRELESS COMMUNICATION DEVICE

(71) Applicant: III Holdings 1, LLC, Wilmington, DE (US)

(72) Inventors: Robert Warner, Holmdel, NJ (US); Jack Winters, Middletown, NJ (US); James June-Ming Wang, San Marino, CA (US)

(73) Assignee: III Holdings 1, LLC, Wilmington, DE (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/848,198

(22) Filed: Mar. 21, 2013

(65) Prior Publication Data

US 2013/0242834 A1    Sep. 19, 2013

Related U.S. Application Data

(63) Continuation of application No. 13/607,104, filed on Sep. 7, 2012, now Pat. No. 8,442,592, which is a continuation of application No. 10/695,932, filed on Oct. 29, 2003, now Pat. No. 8,306,574.

(51) Int. Cl.
*H04M 1/00* (2006.01)
*H04W 72/02* (2009.01)
(Continued)

(52) U.S. Cl.
CPC ............. *H04W 72/02* (2013.01); *H04B 7/0608* (2013.01); *H04B 7/0817* (2013.01); *H04W 24/02* (2013.01); *H04B 7/0854* (2013.01); *H04B 7/0857* (2013.01); *H04B 7/0874* (2013.01)

(58) Field of Classification Search
CPC ............................. H04B 7/0608; H04B 7/082
USPC .................. 455/562.1, 63.4, 575.7, 522, 574, 455/127.1, 127.5, 115.1, 279.1
See application file for complete search history.

(56) References Cited

U.S. PATENT DOCUMENTS 6,134,453 A    10/2000    Sainton et al.
6,167,283 A    12/2000    Korpela et al.
(Continued)

OTHER PUBLICATIONS

International Search Report, PCT Application No. PCT/US2004/036140, dated Jun. 7, 2006.
(Continued)

*Primary Examiner* — Eugene Yun
(74) *Attorney, Agent, or Firm* — Volpe and Koenig, P.C.

(57) ABSTRACT

A method and apparatus for modifying functions in a wireless communication device are described herein. The wireless communication device may receive a selection that indicates a power or a signal processing functionality. The wireless communication device may then modify functions associated with a plurality of smart antennas based on the power or signal processing functionality and in relation to a reference design. The wireless communication device may then determine performance associated with the modified functions. The modified functions may, for example, include adjusting power of the smart antenna of the transmitter or receiver associated with the wireless communication device, adjusting power of the radio frequency (RF) chain of the transmitter or receiver associated with the wireless communication device, varying the number of antenna elements for transmissions or receptions, selecting a signal processing technique, or varying the power control algorithm.

20 Claims, 5 Drawing Sheets

(51) Int. Cl.
*H04B 7/06* (2006.01)
*H04B 7/08* (2006.01)
*H04W 24/02* (2009.01)
*H04B 15/00* (2006.01)

(56) References Cited

U.S. PATENT DOCUMENTS

| | | |
|---|---|---|
| 6,246,870 B1 | 6/2001 | Dent et al. |
| 6,438,389 B1 | 8/2002 | Sandhu et al. |
| 6,714,769 B2 | 3/2004 | Kazakevich et al. |
| 8,306,574 B2 * | 11/2012 | Warner et al. ............ 455/562.1 |
| 8,442,592 B2 * | 5/2013 | Warner et al. ............ 455/562.1 |

OTHER PUBLICATIONS

Written Opinion, PCT Application No. PCT/US2004/036140, dated Jun. 7, 2006.

IPRP, PCT Application No. PCT/US2004/036140, dated Jun. 7, 2006.

Non-Final Rejection, U.S. Appl. No. 10/695,932, dated Sep. 26, 2006.

Final Rejection, U.S. Appl. No. 10/695,932, dated Feb. 10, 2012.

Notice of Allowance, U.S. Appl. No. 10/695,932, dated Aug. 29, 2012.

Non-Final Rejection, U.S. Appl. No. 13/607,104, dated Nov. 2, 2012.

Non-Final Rejection, U.S. Appl. No. 13/607,104, dated Jan. 18, 2013.

Notice of Allowance, U.S. Appl. No. 13/607,104, dated Feb. 13, 2013.

IEEE Standard for Information technology—Telecommunications and information exchange between systems—Local and metropolitan area networks; Specific requirements; Part 11: Wireless LAN Medium Access Control (MAC) and Physical Layer (PHY) specifications Amendment 4: Further Higher Data Rate Extension in the 2.4 GHz Band, IEEE Std 802.11g-2003 (Jun. 27, 2003).

IEEE Wireless LAN Edition, A compilation based on IEEE Std 802.11TM-1999 (R2003) and its amendments, pp. 1-706 (2003).

* cited by examiner

METHOD FOR MODIFYING FUNCTIONS IN A WIRELESS COMMUNICATION DEVICE

CROSS REFERENCE TO RELATED APPLICATION

This application is a continuation of U.S. Ser. No. 13/607,104 filed Sep. 7, 2012, which is a continuation of U.S. Ser. No. 10/695,932 filed Oct. 29, 2003, now U.S. Pat. No. 8,306,574, which applications are fully incorporated herein by reference.

BACKGROUND OF THE INVENTION

1. Field of the Invention

This invention relates generally to wireless communication systems. More particularly, it relates to a method and system for adapting a wireless communication system to provide a desired functionality and to optimize economic benefit by varying one or more of a number of components or processing techniques.

2. Description of the Related Art

Recently, the market for wireless communications has enjoyed tremendous growth. Wireless technology now reaches or is capable of reaching virtually every location on the face of the earth. Hundreds of millions of people exchange information every day using pagers, cellular telephones and other wireless communication products.

With the appearance of inexpensive, high-performance products based on the IEEE 802.11a/b/g Wireless Fidelity (Wi-Fi) standard, acceptance of wireless local area networks (WLANs) for home, Small Office Home Office (SOHO) and enterprise applications has increased significantly. IEEE 802.11b/g is a standard for a wireless, radio-based system. It operates in the unlicensed 2.4 GHz band at speeds up to 11 M bits/sec for IEEE 802.11b and 54 M bits/sec for IEEE 802.11g. The IEEE 802.11b/g specification sets up 11 channels within the 2.4 GHz to 2.4835 GHz frequency band which is the unlicensed band for industrial, scientific and medical (ISM) applications. IEEE 802.11a is another standard for a wireless, radio-based system in the ISM band. It operates in the unlicensed 5-GHz band at speeds up to 54 M bits/sec.

It has been found that WLANs often fall short of the expected operating range when actually deployed. For example, although a wireless Access Point (AP) is specified by a vendor as having an operating range of 300 feet, the actual operating range can vary widely depending on the operating environment.

In particular, WLAN performance can be greatly degraded by direct and multipath radio interference. Multipath occurs in wireless environments because the radio frequency (RF) signal transmitted by the subscriber is reflected from physical objects present in the environment such as buildings. As a result, it undergoes multiple reflections, refractions, diffusions and attenuations. The base station receives a sum of the distorted versions of the signal (collectively called multipath).

Similarly, in any indoor wireless system, multipath interference effects occur when the transmitted signal is reflected from objects such as walls, furniture, and other indoor objects. As a result of multipath, the signal can have multiple copies of itself, all of which arrive at the receiver at different moments in time. Thus, from the receiver's point of view, it receives multiple copies of the same signal with many different signal strengths or powers and propagation delays. The resultant combined signal can have significant fluctuation in power. This phenomenon is called fading.

Unlike all other parts of the radio spectrum, a license is not required to operate a transmitter in the ISM bands specified in IEEE 802.11a/b/g. In exchange for this license-free environment, users implementing the IEEE 802.11b/g and IEEE 802.11a standards are subject to interference from other users of the bands. The 2.4 to 2.4835 GHz ISM band is particularly sensitive to interference because it is populated with numerous wireless networking products such as Bluetooth systems, HomeRF systems, IEEE 802.11b WLAN devices, microwave ovens, and cordless phones that can result in significant interference. This interference is the result of a myriad of incompatible data transmission techniques, uncoordinated usage of spectrum, and over-subscription of the available spectrum.

Many devices operating in the 2.4 to 2.4835 GHz ISM band can either be classified as direct sequence spread spectrum (DSSS) or frequency hopping spread spectrum (FHSS) systems. The DSSS data transmission scheme is used primarily by IEEE 802.11b systems. FHSS systems, such as Bluetooth devices, differ from DSSS systems in their implementation for avoiding interference. FHSS systems avoid interference with other transmission signals in the same band by hopping over many different frequency channels. To provide FHSS systems with more bandwidth, the United States Federal Government Federal Communications Commission (FCC) has allowed FHSS systems to operate at wider bandwidths. The operation of FHSS systems at wider bandwidths has the potential to increase interference between DSSS and FHSS products. The interference level of narrowband FHSS systems on DSSS transmission has already been found to be severe.

There are additional elements of performance degradation in a network of 802.11b/g WLAN access points (APs). Since the 802.11b/g channel bandwidth is approximately 16 MHz, only three non-overlapping channels operating in proximity can be accommodated without interfering with one another. The channel re-use factor imposes a severe restriction on implementation of 802.11b/g based systems which requires significantly more effort in the network deployment, and increases the chances of interference and packet collision especially within an environment with a dense user cluster, such as in an office building.

Several approaches for improving the operating performance and range in a fading environment have been suggested. In one conventional approach, selection antenna diversity is used to reduce the effect of multipath fading. Multiple antennas are located in different locations or employ different polarizations. As long as the antennas have adequate separation in space or have a different polarization, the signal arriving at different antennas experiences independent fading. Combining (or selection) is performed at a dedicated receiver for an antenna or at a receiver used for multiple antennas to improve the quality of received signals. Each antenna can have a dedicated receiver or multiple antennas can share the same receiver.

In another conventional approach, signal combining is used to provide improved performance in a fading environment. Signal combining techniques employ multiple spatially separated and/or orthogonally polarized antennas. The received signal is obtained by combining the signals from the multiple antennas. One technique for providing optimal signal quality is known as maximal ratio combining (MRC). Another combining technique that maximizes the output signal-to-interference-plus-noise ratio is known as minimum mean square error (MMSE) combining.

The signals can be combined in the combining techniques based on a weighting scheme. Weights used in combining techniques can be generated with blind and non-blind techniques. In non-blind techniques, the received signal is demodulated and data sequences in the received signal are used to determine the portion that is the desired signal and the portion that is noise and interference. The demodulated signal is used to determine the combining weights through correlation with the received signals. In blind techniques, a property of the signal is used to distinguish it from interference and noise. In one approach, a constant modulus algorithm (CMA) is used to take advantage of a signal property of a constant signal envelope in order to generate a set of antenna weights such that the constant envelope property can be maintained. Signal combining techniques typically achieve better performance than the selection diversity antenna approaches at the expense of added implementation complexity.

Another known approach to achieve performance improvement is through equalization, either in the time or frequency domain. In this technique, the multipaths arriving at the receiver are delayed, phase shifted, and amplitude scaled before they are combined (equalized).

U.S. Pat. No. 6,167,283 describes optimization of selection of a cell in a cellular radio system where there are available cells of different capabilities and/or where the capability of a terminal to make use of different services of the cells varies from one terminal to another. For example, the cells can provide different services based on the maximum bit rate offered by the base station. A prediction is produced about what kind of service level will be needed in the next connection between a terminal and a base station. A cell is selected such that the service level offered by the base station corresponds to the prediction produced by the terminal.

U.S. Pat. No. 6,134,453 describes an omni-modal wireless product which is adaptive to the selectively variable desires of the end user. The product is capable of utilizing any one of wireless data services within a given geographical area based on a user defined criteria. The user defined criteria can include the cost of sending a data message using the wireless communication network, the quality of transmission link in the wireless communication network (signal strength, interference actual or potential), the potential for being dropped by the wireless communication system, and the security of wireless communication network. An adaptive control circuit is used for determining which wireless communications networks are available at a given location and time, for accessing a selected wireless communication network, for communicating with the selected wireless communication network to determine on a real time basis the operating characteristics of the wireless communication network, and for generating a frequency control signal and a protocol control signal in response to the user defined criteria to cause the device to communicate with the selected wireless communication network using the frequencies and modulation protocol suitable for transmission of the signal information over the selected wireless communications network. The frequency control signal and the protocol control signal are generated by comparing operating characteristics of the selected wireless communication network with the user defined criteria.

U.S. Pat. No. 6,246,870 describes a method for controlling expense incurred by a communications terminal that communicates with a first mobile radio-telephone communications system and a second mobile radio-telephone communication system by selecting the radio-telephone communication system which provides economic efficiencies in a particular mode of operation. More specifically, expenses incurred by a communications terminal that communicates with a first mobile radiotelephone system and a second mobile radiotelephone system are controlled by storing first and second critical values which characterize a tariff structure of the respective first and second mobile radiotelephone communication systems. Communications units used by the communications terminal are measured. An economic efficiency associated with use of the terminal to communicate with the first and second mobile radiotelephone communications systems is determined from the measured communications units and the first and second stored critical values. Measures are initiated to control communications usage with the first and second radiotelephone communications systems by the terminal based on the determined economic efficiency.

While some of the above-described patents have been concerned with optimization of a wireless network system based on selection of a wireless network providing certain characteristics, none of the above-described patents are concerned with optimization of economic value to an end user by altering the complexity of the wireless network system based on the end user's desires.

It is desirable to provide a wireless communication system that can be adaptively configured to provide performance selected by the end user while providing an optimization of an economic benefit to the end user, such as one or more of range extension, multipath mitigation and interference suppression.

SUMMARY OF THE INVENTION

The present invention relates to a method and system for adapting a wireless communication system to support a desired functionality of the wireless communication system at an optimized performance and economic benefit. The desired functionality can be determined by defined criteria such as a maximum range of communication with the wireless communication system, quality of a transmission link in the wireless communication system, capacity of the wireless communication system, power consumption of the wireless communication system, protocols supported in the wireless communication system, modulation techniques used in the wireless communication system and processing techniques for combining signals in the wireless communication system. The system can be adapted by varying one or more of the number of components, power consumption or processing techniques used in the wireless communication system.

In one embodiment, the adapted wireless communication system is determined by adapting the number of antennas used at a transmitter or receiver and/or the number of RF chains used at a transmitter or receiver for providing the desired quality of transmission link, capacity and power consumption of the wireless communication system. The adapted wireless communication system can also include selection diversity for multipath mitigation. Selection diversity can be used with a determined number of antennas of the wireless communication system. Processing techniques for modulation and combining signals and protocols used in the adapted wireless communication system are selected to support the desired functionality. Accordingly, the wireless communication system can be adapted to achieve a desired functionality at an optimized cost by providing only the features that are needed to support the desired functionality.

The adaptive wireless communication system has the advantages of being capable of providing a varied operating range in a multipath environment, a varied ability to suppress interference, a varied level of power consumption and a varied cost. The adaptive wireless communication system is compatible with existing WLAN systems.

The invention will be more fully described by reference to the following drawings.

DETAILED DESCRIPTION

Figure 1:
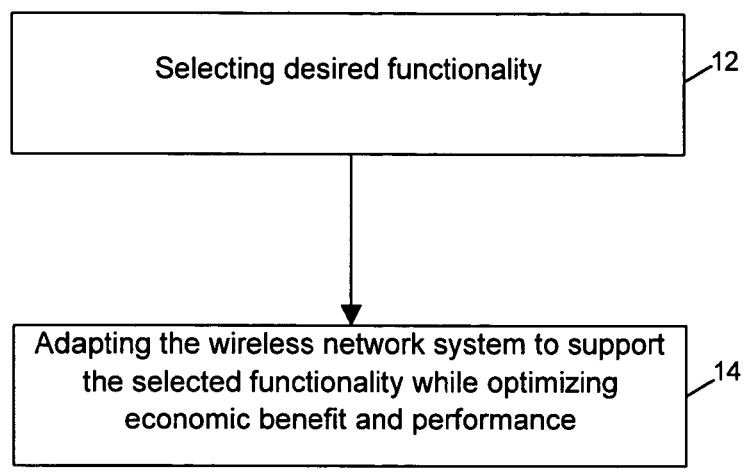
FIG. 1 is a flow diagram of a method for adapting a wireless communication system for optimization of economic benefit.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a block diagram of a method for adapting a wireless communication system based on optimization of economic benefit. In block 12, a selection of desired functionality is performed. For example, the selection can be performed by a supplier of a wireless network system, a vendor of a wireless network product or an end user of a wireless network system. Criteria defining the functionality of the wireless communication system can include: the maximum range of communications within the wireless communication system; the quality of a transmission link in the wireless communication system, resulting from one or more of range extension, multipath mitigation and interference suppression; capacity of the wireless communication system, power consumption of the wireless communication system, protocols supported in the wireless communication system, modulation techniques used in the wireless communication system, processing techniques for combining signals in the wireless communication system, criteria which a vendor or end user could variably program into a wireless communication system or any one or more combinations of the above criteria.

In block 14, the wireless communication system is adapted to support the selected functionality while optimizing economic benefit. The wireless communication system can be adapted by modifying the complexity of a smart antenna chip or chip set by turning on or off functions of the chip or chip set and selection of processing techniques used with the antenna chip or chip set such that a vendor or user can purchase or license only the functions needed for achieving the desired functionality. Accordingly, the wireless communication system can be adapted to achieve a desired performance at an optimized cost and complexity.

Figure 2:
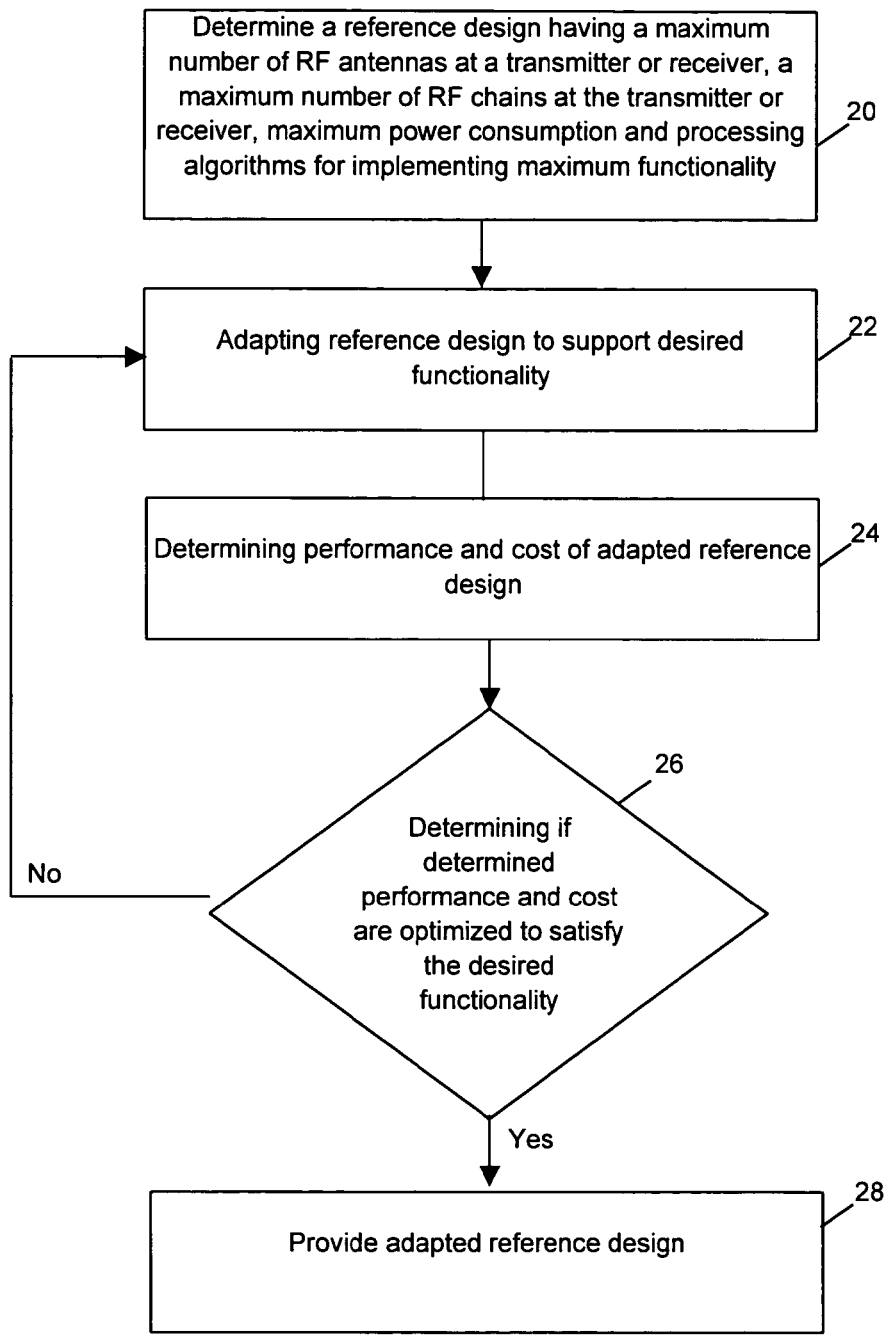
FIG. 2 is a flow diagram of a method for implementing a feature of FIG. 1.

An implementation of block 14 is shown in FIG. 2. In block 20, a reference design of a smart antenna chip or chip set is determined having a maximum number of RF antennas at the transmitter or receiver, a maximum number of RF chains at the transmitter or receiver, maximum power consumption and processing techniques for implementing maximum functionality. In block 22, the reference design is adapted to support the desired functionality. For example, the number of RF antennas at the transmitter or receiver can be adapted by turning on or off each of the antennas in order to support the desired functionality. Additionally, the number of RF chains at the transmitter or receiver can be adapted by turning on or off each of the RF chains in order to support the desired functionality.

In addition, antenna selection diversity techniques can be used with a pre-determined number of RF antennas in order to support the desired functionality by improving overall system performance with fewer RF chains than antennas. For example, system performance is improved by range extension, multipath mitigation and interference suppression. Suitable antenna diversity can be provided by several techniques, including one or more of spatial diversity, beam diversity, polarization diversity, angular diversity, pattern diversity and other conventional diversity techniques. The diversity techniques can be used either at the receiver or transmitter or both.

Power consumption can be adapted in the reference design by implementation of one or more features of varying the number of RF chains, varying the number of antenna elements and varying the power control algorithm. For example, the reference design can be adapted to provide a selected functionality of low power consumption by reducing the number of RF chains of the transmitter or receiver. Alternatively, the reference design can be adapted to provide the selected functionality of low power consumption by increasing the number of RF chains at the receiver to provide a higher signal to noise ratio and higher transmit data rate such that the total transmit time can be reduced, thereby reducing power consumption. The power control algorithm can be selected from an open loop power control algorithm, closed loop power control algorithm or other available power control algorithms known in the art. Open loop power control adjusts the transmitted power according to the received signal quality. Closed loop power control transmits received signal quality data to allow the sender to adjust the transmit power. The diversity, combining gain or interference suppression techniques can be selected to be independent of process, temperature and component variations.

The reference design also can be adapted to support the desired functionality by selection of the processing techniques to be used for processing and/or combining signals from one or multiple antennas. For example, processing techniques can be blind techniques (that do not require training sequences) or non-blind techniques (that may require training). Suitable processing techniques include one or more of maximal ratio combining (MRC), equal-gain combining, minimum mean square error (MMSE) combining and other conventional processing techniques available in the art.

In block 24, the performance and cost of the adapted reference design are determined. For example, the performance can be determined by measuring the quality of a signal generated by the adapted reference design according to techniques known in the art of wireless communications. Suitable quality measurements can be made using received signal power, baseband eye opening, color code correlation and cyclic redundancy checking (CRC). For example, the cost of the adapted reference design can be determined by combining the costs of the individual components and connections selected in the reference design, as well as processing costs. In block 26, it is determined if the determined performance and cost have been optimized to satisfy the desired functionality selected in block 12. If the determined performance and cost do not satisfy the selected desired functionality, blocks 24 through 26 are repeated. If the determined performance and cost satisfy the selected functionality, the adapted reference design is provided and can be used for implementing the adaptive wireless communication system.

Figure 3:
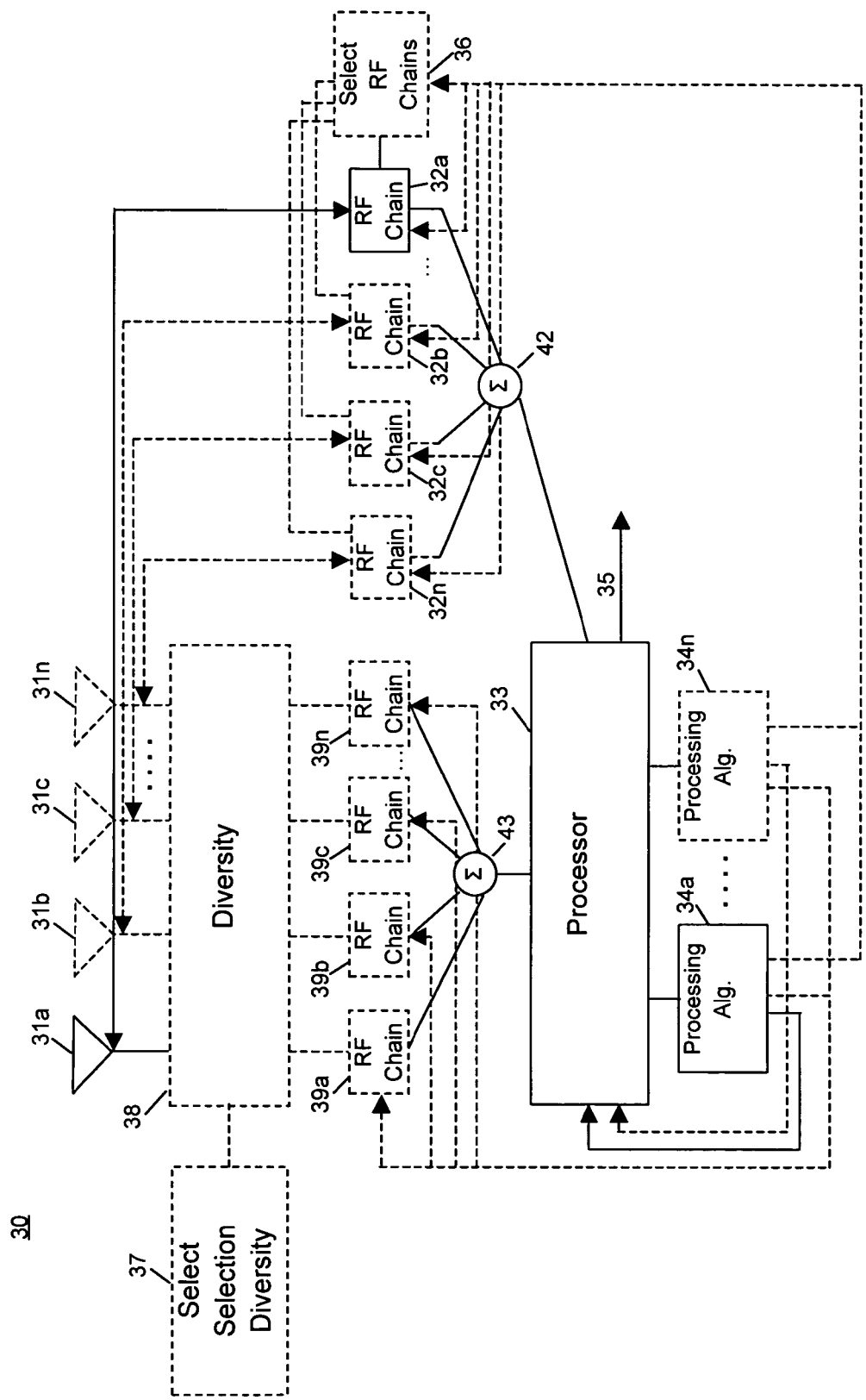
FIG. 3 is a schematic diagram of a system for adapting a wireless communication system based on optimization of economic benefit.

FIG. 3 is a schematic diagram of an implementation of a system for providing an adaptive wireless communication system. An adaptive wireless communication system of least complexity which can be used to support desired functionality comprises antenna 31a at a receiver which is coupled to RF chain 32a. It will be appreciated that the least complex system typically provides a wireless communication system having a lowest cost. It is noted that the antenna can be a single omnidirectional antenna, single sector antenna or an array of multiple omnidirectional or sector antennas. RF chain 32a receives a signal from antenna 31a. The selected signal is preferably frequency downconverted and analog to digital (A/D) converted by the RF chain. The RF chain may contain multistage frequency downconverters. RF chains are well known in the art and the term RF chain is used in this disclosure to encompass any component or components used at least for downconverting and possibly (not necessarily) A/D converting. RF chain 32a feeds into processor 33. Processor 33 uses one or more processing techniques 34a-34n to provide signal output 35 that is demodulated and decoded into bits to estimate the transmitted signal. Processor 33 can also include modules for implementing optimization of performance and costs described above in blocks 24-26 by receiving, storing and comparing information related to quality measurements of the adapted reference design.

Figure 4:
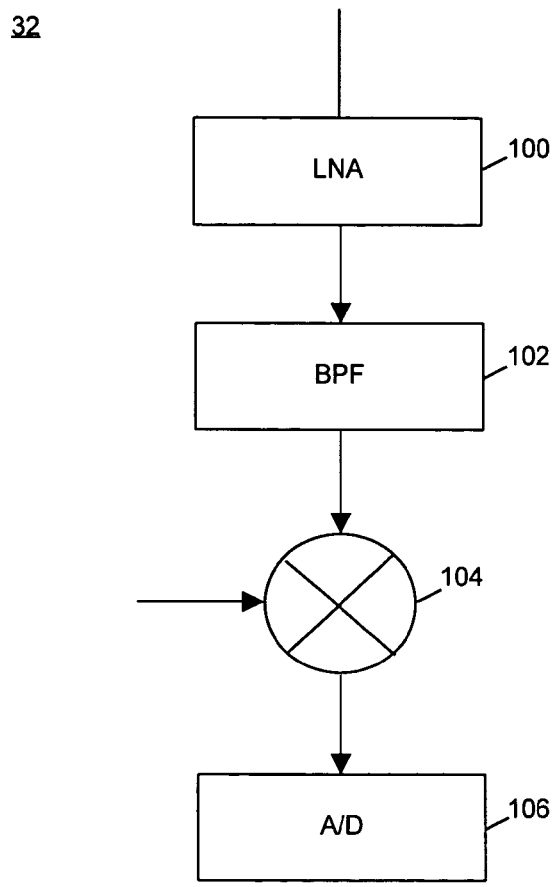
FIG. 4 is a schematic diagram of an implementation of an RF chain for use in the wireless communication system.

An example of RF chain 32 is shown in FIG. 4. The signal received by antenna 31 is applied to low noise amplifier (LNA) 100 where it is amplified to an amplitude suitable for subsequent processing. The amplified signal is applied to band pass filter (BPF) 102 to limit the signal to a particular frequency band of the received signal and reject out of band RF signals. BPF 102 can be fixed, tuned or tunable and the bandwidth will be designed as appropriate to system design requirements and constraints. The filtered signal is applied to multiplier 104. Multiplier 104 applies weights established by processing techniques 34a-34n. Output from multiplier 104 is applied to analog to digital converter 106 to convert the signal to a representative digital signal which can be processed by processor 33.

Referring to FIG. 3, if it is found that the above-described system for providing an adaptive wireless network does not provide the desired functionality, an adapted wireless communication system of an increased complexity system to support the desired functionality with optimized economic benefit can be established including one or more additional antennas 31b-31n. Antennas 31b-31n are respectively coupled to RF chains 32b-32n. In this embodiment, each antenna 31a-31n is associated with its own respective RF chain 32a-32n. In alternate embodiments, each RF chain 32a-32n can be associated with more than one antenna 31a-31n through the use of selection diversity as described below (as in diversity selection module 38/37). Typically, 2 to 4 antennas are used in wireless communication systems.

Select RF chains module 36 can dynamically select one or more of RF chains 32a-32n. Select RF chains module 36 can select the RF chains based on a signal received from respective antennas 31a-31n based, for example, on having the highest power. For example, select RF chains module 36 can compare the power of the antennas associated with each of the RF chains to select two antennas having the highest power. RF chains module 36 can activate a switch (not shown) for dynamically turning on and off RF chains 32a-32n. The output of the RF chains selected by RF chains module 36 can be combined in combiner 42 using weights established by one or more processing algorithms 34a-34n. For example, processing algorithms 34a-34n can include MRC, equal-gain combining, minimum mean square error (MMSE) combining and other conventional processing techniques known in the art to provide antenna weights to be used in combining the signals from the RF chains. The antenna weights used with the associated antennas of selected RF chains can be determined by processing algorithms 34a-34n.

In one embodiment, the number of RF processing chains is selected to provide the desired power consumption. For example, if the received power is high enough, only one antenna and RF chain can be activated. Alternatively, if the received power falls into a range requiring multiple antennas, multiple antennas and multiple RF chains are activated. In another embodiment, multiple RF chains are used to provide a higher SNR which permits a higher transmit data rate and therefore reduces the total transmit time, thereby decreasing total power consumption for a given transmitted number of bits.

In an alternate embodiment, the system for providing an adaptive wireless network to support the desired functionality can include selection/combining diversity. Select diversity module 37 is activated to select diversity 38 to be used with a plurality of antennas 31a-31n. Selection/combining diversity can include techniques for selection of antennas and combining of selected antennas. Output of RF chains 39a-39n associated with the plurality of antennas 31a-31n selected by diversity 38 can be combined in combiner 43 using weights established by one or more processing algorithms 34a-34n. RF chains 39a-39n operate similarly to RF chains 32a-32n. Selection/combining diversity can be used in combination with the RF chains selection technique described above, such that the number of RF chains, 39a-31n, is selected to support the desired functionality.

Figure 5:
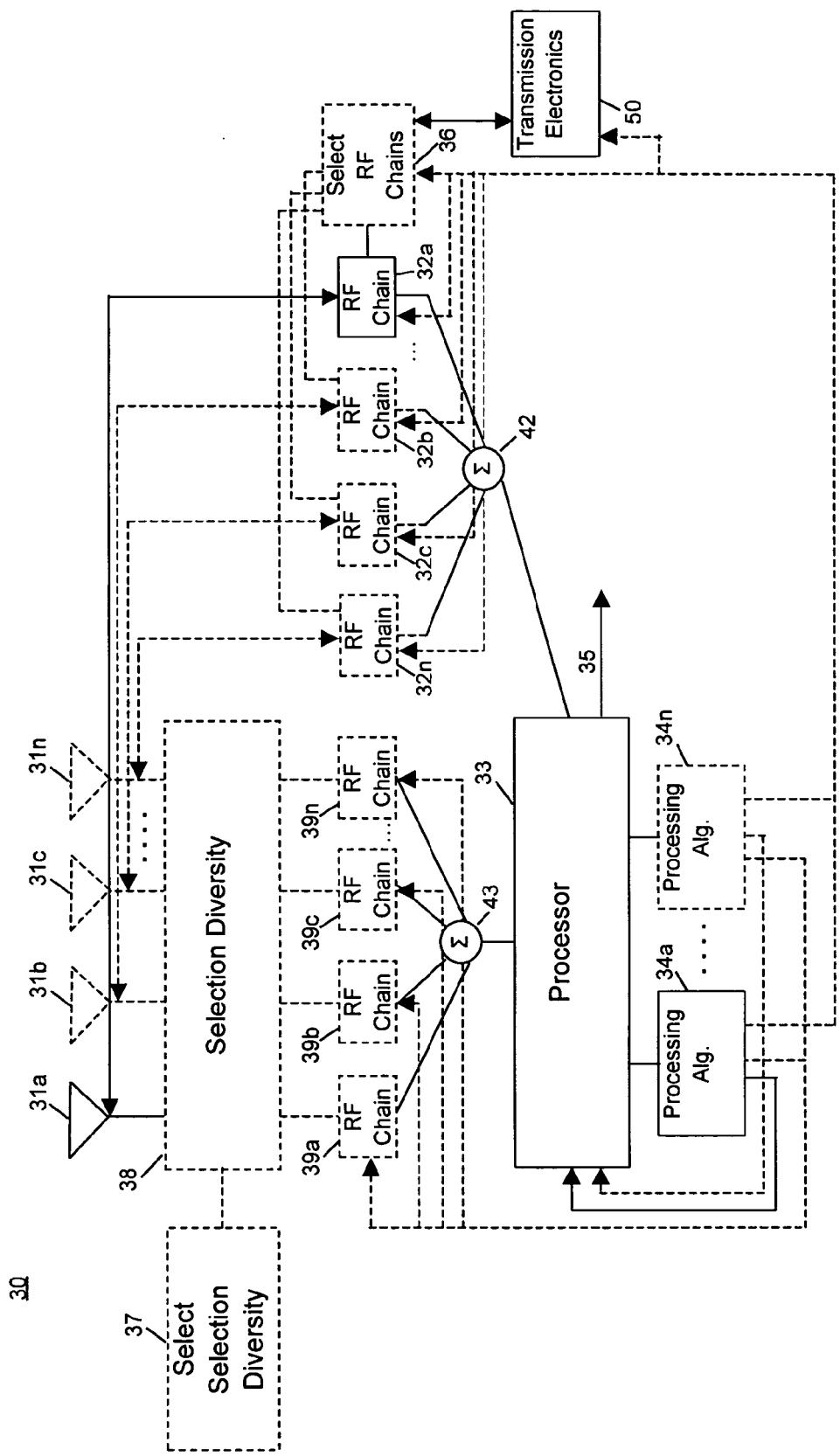
FIG. 5 is a schematic diagram of a system for adapting a wireless communication system including transmission.

The adaptive techniques of the present invention are also applicable to signal transmission. The system of the present invention is particularly well suited for use in time division duplex systems, as defined in IEEE 802.11. The best antennas/beampatterns for reception can be often associated with the best antennas/beampatterns for transmission. Transmission electronics 50 can be associated with processor 33 and select RF chains module 36 to connect selected antennas 31a-31n during transmission using weights established by one or more processing algorithms 34a-34n, as shown in FIG. 5. It will be appreciated that each selected RF chain requires power even if transmitted signal power with the associated RF chain is very low. The desired power consumption can be provided by selecting a reduced number of RF chains for transmission even though more transmit power may be required in the selected RF chains. Furthermore, the selected RF chains can be connected to any of the antennas 31a-31n using the selection diversity technique as described above for reception.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

The invention claimed is:

1. A method performed by a wireless communication device, the method comprising:
   receiving, by the wireless communication device, a selection that indicates a power or a signal processing functionality;
   modifying, by the wireless communication device, functions associated with a plurality of smart antennas based on the power or signal processing functionality and in relation to a reference design; and
   determining, by the wireless communication device, performance associated with the modified functions.

2. The method of claim 1, wherein the modified functions include powering down a smart antenna of a transmitter or a receiver associated with the wireless communication device.

3. The method of claim 1, wherein the modified functions include powering up a smart antenna of a transmitter or a receiver associated with the wireless communication device.

4. The method of claim 1, wherein the modified functions include powering down a radio frequency (RF) chain of a transmitter or a receiver associated with the wireless communication device.

5. The method of claim 1, wherein the modified functions include powering up a radio frequency (RF) chain of a transmitter or a receiver associated with the wireless communication device.

6. The method of claim 1, wherein the modified functions include varying a number of antenna elements for transmissions or receptions.

7. The method of claim 1, wherein the modified functions include varying an open loop power control algorithm.

8. The method of claim 1, wherein the modified functions include varying a closed loop power control algorithm.

9. The method of claim 1, wherein the modified functions include selection of a processing technique to process and combine signals from the plurality of smart antennas.

10. The method of claim 9, wherein the processing technique is any one of maximal ratio combining (MRC), equal-gain combining, or minimum mean square error (MMSE) combining.

11. A wireless communication device comprising:
an interface configured to receive a selection that indicates a power or a signal processing functionality;
a processor configured to modify functions associated with a plurality of smart antennas based on the power or signal processing functionality and in relation to a reference design; and
the processor further configured to determine performance associated with the modified functions.

12. The wireless communication device of claim 11, wherein the modified functions include powering down a smart antenna of a transmitter or a receiver associated with the wireless communication device.

13. The wireless communication device of claim 11, wherein the modified functions include powering up a smart antenna of a transmitter or a receiver associated with the wireless communication device.

14. The wireless communication device of claim 11, wherein the modified functions include powering down a radio frequency (RF) chain of a transmitter or a receiver associated with the wireless communication device.

15. The wireless communication device of claim 11, wherein the modified functions include powering up a radio frequency (RF) chain of a transmitter or a receiver associated with the wireless communication device.

16. The wireless communication device of claim 11, wherein the modified functions include varying a number of antenna elements for transmissions or receptions.

17. The wireless communication device of claim 11, wherein the modified functions include varying an open loop power control algorithm.

18. The wireless communication device of claim 11, wherein the modified functions include varying a closed loop power control algorithm.

19. The wireless communication device of claim 11, wherein the modified functions include selection of a processing technique to process and combine signals from the plurality of smart antennas.

20. The wireless communication device of claim 19, wherein the processing technique is any one of maximal ratio combining (MRC), equal-gain combining, or minimum mean square error (MMSE) combining.

* * * * *